United States Patent

[11] 3,558,935

[72] Inventors Eugene C. Gritton and Benjamin Pinkel, Santa Monica, Calif.
[73] Assignee The United States of America as represented by the United States Atomic Energy Commission
[21] Appl. No. 775,250
[22] Filed Nov. 13, 1968
[45] Patented Jan. 26, 1971

[54] GASEOUS-FUELED NUCLEAR REACTORS FOR ELECTRICAL POWER PRODUCTION
7 Claims, 7 Drawing Figs.

[52] U.S. Cl. ............................................. 310/4, 176/39; 165/105
[51] Int. Cl. ......................................................... H02h 3/00
[50] Field of Search........................................... 310/4; 176/39; 165/105

[56] References Cited
UNITED STATES PATENTS

| | | | |
|---|---|---|---|
| 3,202,582 | 8/1965 | Rom............................ | 176/39X |
| 3,223,591 | 12/1965 | McLafferty................. | 176/39X |
| 3,403,075 | 9/1968 | Fiebelmann................. | 165/105X |
| 3,414,475 | 12/1968 | Fiebelmann................. | 165/105X |
| 3,441,752 | 4/1969 | Grover et al................. | 165/105X |
| 3,482,120 | 12/1969 | Wilson......................... | 310/4 |

*Primary Examiner*—Reuben Epstein
*Attorney*—Roland A. Anderson

ABSTRACT: Nuclear reactors are described in which fissile fuel material in gaseous form is utilized as an energy source for the production of electrical power. The active core region of such reactors comprises gaseous fuel disposed within a cavity or cavities and surrounded by a material having both reflector and moderator properties. A high temperature liner is provided to contain the gaseous fuel while permitting it to attain temperatures where heat transfer by thermal radiation predominates within the cavity or cavities. The heat reaching the cavity wall or walls is converted to electrical energy by several methods including the use of thermionic converters immediately adjacent the wall or walls or located remotely therefrom, or by using a circulating thermodynamic working fluid in combination with the thermionic converters and passing it through a conventional turboelectric generator loop.

INVENTORS.
Eugene C. Gritton
BY Benjamin Pinkel

ATTORNEY.

INVENTORS.
Eugene C. Gritton
BY Benjamin Pinkel

ATTORNEY.

INVENTORS.
Eugene C. Gritton
BY Benjamin Pinkel

ATTORNEY.

GASEOUS-FUELED NUCLEAR REACTORS FOR ELECTRICAL POWER PRODUCTION

BACKGROUND OF THE INVENTION

The invention described herein relates generally to nuclear reactors, and more particularly to gaseous fueled nuclear reactors for the production of electrical power. It was made in the course of, or under, a contract with the U.S. Government.

Nuclear reactors designed to produce electrical power have been generally restricted to using solid fuel material in the form of fuel elements. In such reactors, the useful life of the fuel elements is limited by the accumulation of fission products and by structural damage due to radiation effects. When the fuel elements reach their maximum useful lifetime as dictated by such limitations, they must be removed from the core and reprocessed to reclaim all remaining fissile material contained therein. Reprocessing followed by subsequent refabrication into new fuel elements are expensive procedures which add to the overall cost of power from solid fuel reactors. The removal and replacement of fuel elements in a nuclear reactor generally requires that the reactor be shut down with a corresponding decrease in its useful online power production capacity and reliability. Accidental fuel element failures further complicate reactor operation by forcing unscheduled shutdowns of the reactor. The operating temperatures of solid fuel elements must be kept low enough to avoid weakening or melt-down of structural material and a resulting loss of fission products. Furthermore, the danger of such fission product loss increases as the fuel element is kept in the reactor since both the fission product inventory and radiation induced defects are constantly increasing with increased fuel element burnup. Thus the solid fuel element is weakest when it needs to be strongest.

Liquid fuel reactors, although alleviating some of the disadvantages enumerated above, present some severe problems of their own. Otherwise suitable liquid fuels have been found to be highly corrosive or difficult to handle because of their intense radioactivity and high melting points. Since the fuel must be maintained in the liquid state, the maximum temperature of the fuel is also limited with a corresponding limit being imposed on core power density.

A nuclear reactor utilizing gaseous fuel can in theory operate at temperatures greatly exceeding those permissible in solid and liquid fueled systems since the fissile material appears as a vapor and there is no solid core structure to melt or subject to radiation damage. Continuous and inexpensive reprocessing is also possible so as to permit high burnup and continuous reactor operation. In order to realize the full advantages of gaseous fuels, however, means must be provided for removing heat from the fuel and converting it in a practical way to a useful form of energy.

It is, accordingly, a general object of the invention to provide a gaseous fueled nuclear reactor for electrical power production.

SUMMARY OF THE INVENTION

In accordance with the invention, a gaseous fueled nuclear reactor is provided for the production of electric power. A cavity or cavities are provided with high temperature liners and filled with gaseous fissile fuel to define an active core region. The phrase "gaseous fissile fuel" or "gaseous fuel" as used herein refers to fissile material in the vapor state and does not include gaseous compounds containing fissile material. The high temperature liner contains the fuel while permitting it to attain temperatures at which heat transfer by thermal radiation predominates within the fuel. The high temperature cavity liner is made of material that can be operated at a temperature above the vaporization temperature of the fissile material to avoid condensation of the fissile material on the liner. Thermionic converters convert a portion of the energy reaching the liner into electrical energy. Because of the high temperature at which the cavity liner operates, the thermionic converters are particularly well suited for use in a topping cycle where waste heat from the converters is used to supply a turbo-electric generator loop. A gaseous fueled reactor is thus provided for the production of electrical energy which can be operated at high temperatures and without the burnup limitations imposed on solid fuel reactors.

DESCRIPTION OF THE PREFERRED EMBODIMENT

Figure 1:
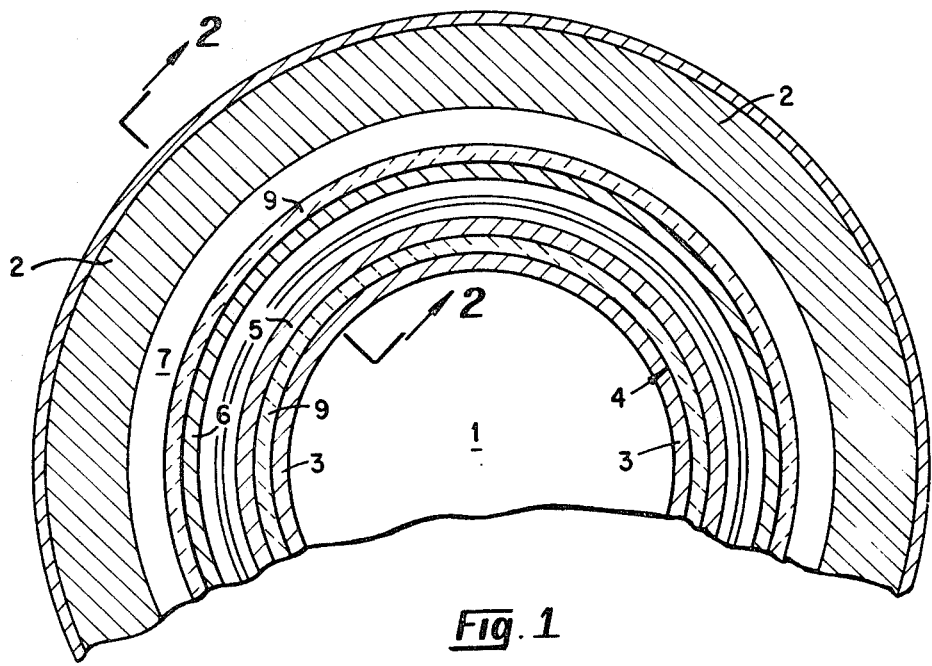
FIG. 1 schematically illustrates, in transverse section, a gaseous fueled reactor made in accordance with the invention.

FIG. 1 illustrates the basic concept of a gaseous fueled nuclear reactor for the production of electrical power. A central cavity 1 is surrounded by an annular region 2 of material having both reflector and moderator properties such as graphite or beryllium oxide. In operation, gaseous fuel in the form of plutonium or uranium vapor is introduced into the cavity until a sufficient density is reached for nuclear criticality. The power level of the reactor is then raised until the gaseous fuel reaches a temperature where heat is transferred to the cavity walls primarily by thermal radiation.

A high temperature surface protection layer 3 lines the inner surface of cavity 1. Layer 3 is maintained at a temperature above the boiling point of the gaseous fuel but below its own solid state temperature limit. Gaseous uranium fuel and a graphite liner provide a workable combination as the 3817° C. vaporization temperature of uranium is well below the triple point temperature of graphite (approximately 4700° C.). The surface temperature of the graphite liner must be held above 3817° C. but below its triple point temperature so that uranium will not condense on the liner and the liner will remain structurally sound.

In the surface temperature range specified for uranium fuel, the carbon atoms sublime from the graphite liner until an equilibrium vapor pressure corresponding to the surface temperature is reached. At equilibrium, each carbon atom that leaves the surface of the graphite liner is replaced by another carbon atom returning from the vapor, with the result that the thickness of the carbon layer remains substantially constant after equilibrium is reached and defects in the graphite surface such as cracks are continuously healed.

Where plutonium vapor is used as the fissile material, the same general principles apply. The plutonium is held at a temperature above its vaporization temperature of 3235° C. and the surface of the cavity liner is held between 3235° C. and the melting point or sublimation temperature of the liner material. Some suitable liner materials and temperature limits applicable thereto in a plutonium fueled reactor are listed in the table below.

SELECTED MATERIALS FOR CAVITY LINER IN PLUTONIUM FUELED REACTOR

| | Operating Temperature Limits, ° C. | |
|---|---|---|
| | Above | Below |
| Carbon | 3,235 | 4,700 |
| Niobium carbide | 3,235 | 3,500 |
| Tantalum carbide | 3,235 | 3,880 |
| Zirconium carbide | 3,235 | 3,540 |

Figure 2:
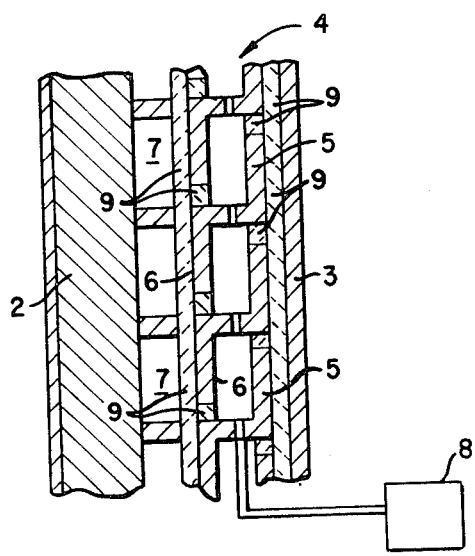
FIG. 2 is a partial sectional view taken normal to the plane of FIG. 1 illustrating the structure and placement of the thermionic converters in greater detail.

Since the fuel material is in a gaseous form, its temperature is limited only by the amount of thermal flux that can be dissipated at the walls of the cavity without exceeding the temperature limits imposed by the selection of liner materials. Although the thermal flux delivered to the cavity wall can be converted into electricity by any one of several known processes, thermionic converters 4 are preferred because of the high temperature of cavity liner 3. Thermionic converters 4 are shown in greater detail in the sectional view of FIG. 2 taken normal to the plane of FIG. 1. As shown in FIG. 2, the converter emitters 5 are heated directly by the heat flow through liner 3 and the converter collectors 6 are cooled by coolant flow through coolant channels 7. Cesium contained in a reservoir 8 held at an effective operating temperature may be introduced into the spaces within the thermionic converter between the emitters 5 and collectors 6 in order to reduce the space charge and enhance the performance of the converters. The coolant may then be used to provide heat for a secondary electrical power generating system such as a turbo-electric generating system. Electrical insulation 9 is provided to electrically isolate the emitters and collectors which may be connected in series as shown in FIG. 2 to provide any desired voltage output. Another advantage of this system is that the heat flux incident on emitters 5 is substantially constant along their entire length, thereby facilitating the design of the converters for maximum efficiency.

Although the gaseous fuel can provide any desired heat flux at the cavity walls, the heat flux to the emitters must be limited to a range from 25 to 50 watts per square centimeter. Where it is desired to obtain a larger electrical output than can be attained by simply placing the converters adjacent the high temperature liner, heat pipes can be used. One suitable configuration is shown in FIG. 3.

Figure 3:
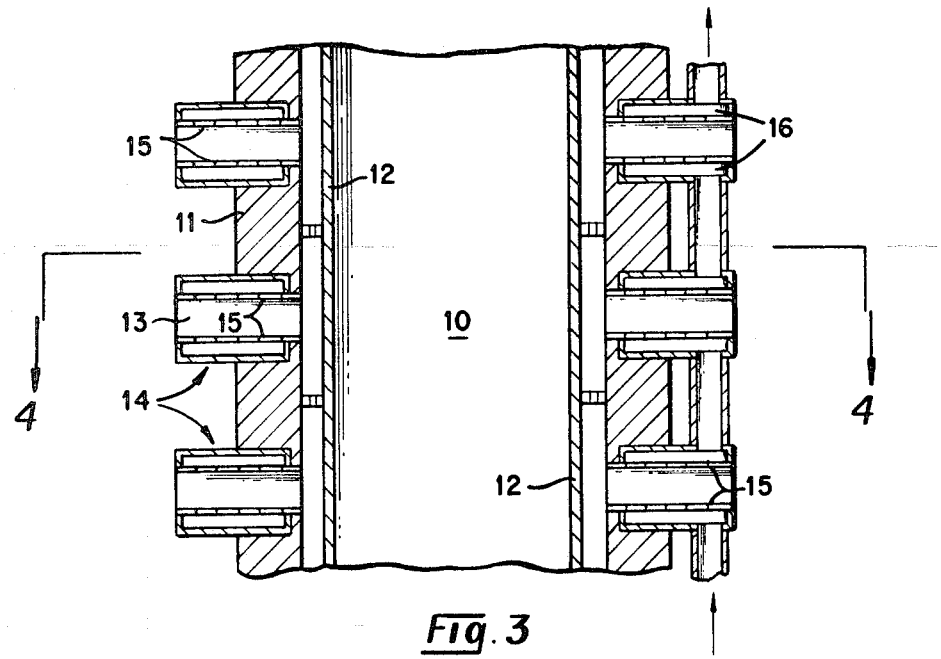
FIG. 3 schematically illustrates, in longitudinal section, a gaseous fueled reactor equipped with heat pipes and thermionic converters.
Figure 4:
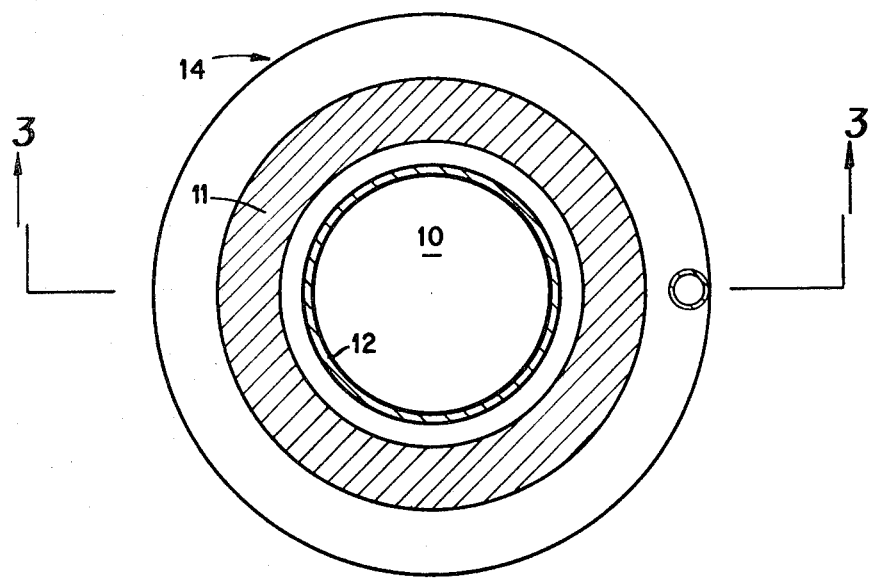
FIG. 4 is a sectional view taken normal to the plane of FIG. 3.

FIGS. 3 and 4 are sectional views of a gas fueled nuclear reactor showing a cylindrical cavity region 10 filled with gaseous fuel and surrounded by a reflector-moderator material 11. Cylindrical cavity walls 12 serve as the evaporator sections of a series of heat pipes whose condensing sections 13 are located in annular fins 14 surrounding fueled cavity region 10. Located between the annular fins is the reflector-moderator material 11. The heat flux to the evaporator section of the heat pipe can be made very large (400-500 watts per square centimeter) without exceeding the heat flux limitations on the thermionic converters 15 adjacent the condensing sections of the heat pipes. The area of annular fins 14 can be varied to provide any heat flux desired to converters 15 and a greater overall electrical output obtained with a larger surface area. The waste heat from the collectors of the thermionic converters can be removed by a coolant in passages 16 and transferred to a second power conversion system such as a turboelectric system (not shown).

Figure 5:
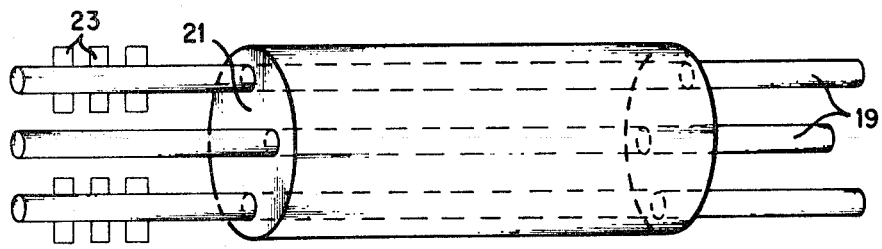
FIG. 5 schematically illustrates a gaseous fueled nuclear reactor utilizing a multiplicity of tubular elements passing through a container filled with gaseous fuel.
Figure 6:
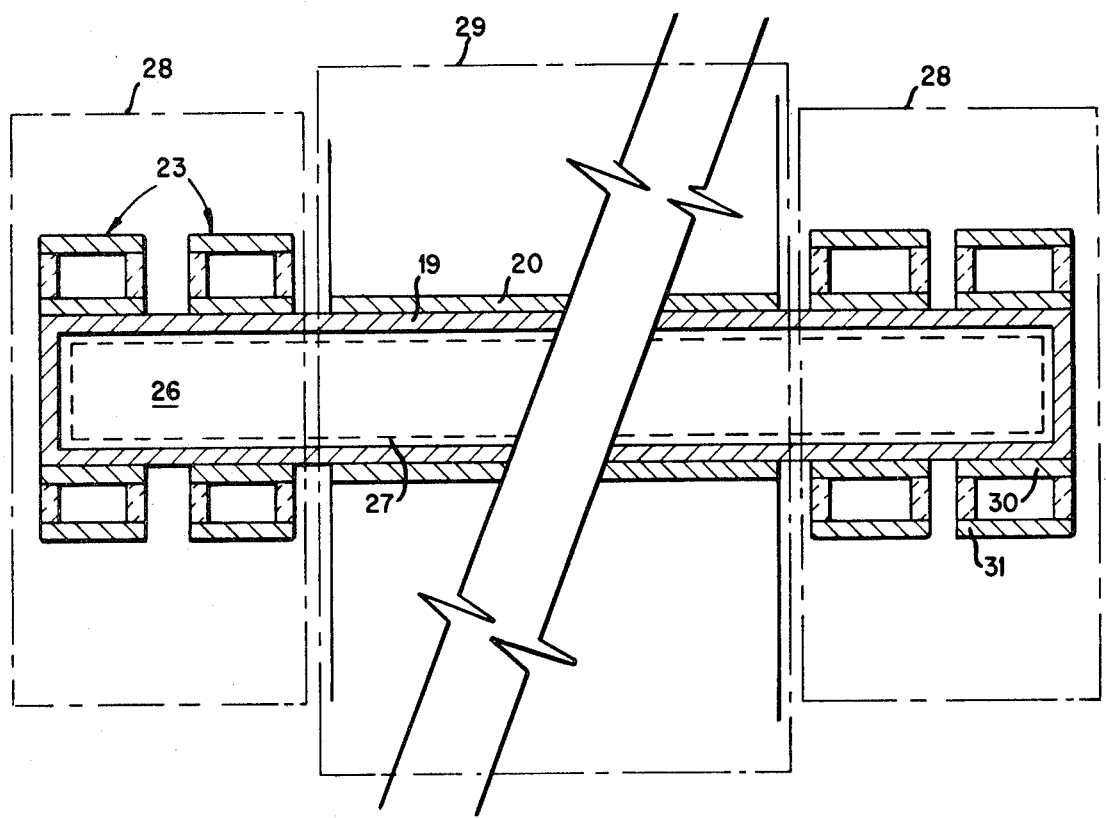
FIG. 6 is a detailed sectional view of a tubular element and associated thermionic converters used in connection with the reactor of FIG. 5.

An alternative reactor core design employing heat pipes and thermionic converters is illustrated in FIGS. 5 and 6. As shown schematically in FIG. 5, a number of tubular elements 19 (only three shown) pass through a container 21 defining the reactor active core region. The tubular elements 19 comprise heat pipes which extend out of the reactor active core region. Banks of thermionic converters 23 are located on the condenser ends of the tubular elements. Gaseous fuel fills the interstices of elements 19 within the active core region.

Referring now to FIG. 6, a more detailed view of a heat pipe arrangement comprising the tubular elements 19 of FIG. 5 is illustrated. A liner 20 made of a material which is solid at temperatures above the vaporization temperature of the fissile material surrounds tube 19. The space 26 in tube 19 contains a condensable vapor serving as a heat carrier fluid and wire mesh inserts 27 for returning condensed vapor from the condenser region 28 of the heat pipe to the evaporator region 29 by capillary action. Thermionic converters 23, comprising emitter portions 30 and collector portions 31, are disposed about heat pipes 19 in condenser regions 28.

Fission energy released in the gaseous fuel material in container 21 is transmitted by thermal radiation to liner 20 and then by conduction to tube 19 where it evaporates heat carrier fluid within the tube. The heat is then transferred by vapor transport to the condenser regions 28 of the heat pipes. The vapor condenses in condenser regions 28, liberating heat energy to the emitter portions 30 of the thermionic converters. Waste heat from the collector portions of the converters can be radiated to space or removed by a suitable coolant and used for further power production depending on the particular application of the reactor.

Figure 7:
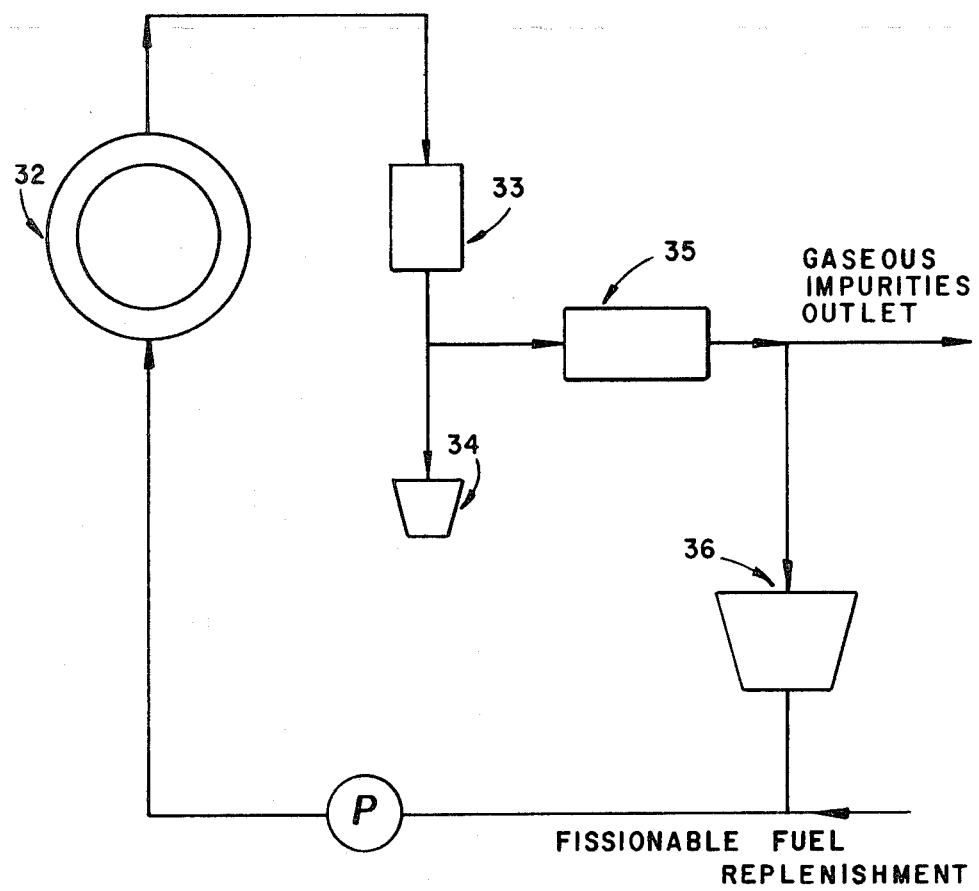
FIG. 7 is a schematic diagram illustrating a continuous reprocessing procedure for gaseous fuel.

An advantage of gaseous fueled nuclear reactors over solid fuel reactors is that the gaseous fuel can be continuously circulated through the active core region. This permits the continuous reprocessing of the nuclear fuel and results in a system with little fission product buildup and minimum initial excess reactivity requirements. A suitable reprocessing procedure is outlined schematically in FIG. 7. Some of the gaseous fuel mixture is bled off continuously from reactor 32. It is then passed through a first condenser 33 where the fuel mixture temperature is lowered to a temperature slightly above the boiling point of the pure fissionable fuel component. All the impurities present in the fuel mixture which have boiling points above that of the fissionable fuel condense out and are collected in first sump 34. The fuel mixture remaining in the gaseous state is passed through a second condenser 35 which lowers the temperature of the fuel mixture to a value slightly below the boiling point of the pure fissionable fuel component. The fissionable fuel condenses out and is collected in second sump 36 leaving the remaining impurities in a gaseous state.

The condensed fuel is revaporized and returned to the core in a completely closed recirculation cycle. A small amount of fuel is added after each cycle to compensate for fuel burned in the reactor as well as the negative reactivity effect of any remaining fission products and higher isotopes of the fissionable fuel species used. In this manner, essentially unlimited burnup of the fissionable fuel may be achieved.

We claim:

1. A gaseous fueled nuclear reactor for producing electrical energy comprising:
   a. a lining defining a cavity for containing said gaseous fuel, said lining having a melting point exceeding the vaporization temperature of said gaseous fuel;
   b. moderator-reflector means disposed about and spaced apart from said lining for inducing a neutron chain reaction in said gaseous fuel within said cavity;
   c. a multiplicity of thermionic converters disposed immediately adjacent said lining for receiving heat transmitted to said lining from said gaseous fuel within said cavity, said thermionic converters producing electrical energy from said heat; and
   d. means for removing waste heat from said thermionic converters.

2. The nuclear reactor of claim 1 wherein said gaseous fuel is uranium and said lining is graphite.

3. The nuclear reactor of claim 1 wherein said means for removing waste heat from said thermionic converters comprises coolant channels passing between said moderator-reflector means and said thermionic converters.

4. A gaseous fueled nuclear reactor for providing electrical energy comprising:
   a. a substantially cylindrical container for receiving gaseous fissile fuel;
   b. a plurality of annular heat pipes encircling said container, each of said heat pipes comprising an evaporator portion disposed immediately adjacent said container and a condenser portion spaced apart from said container and intercommunicating with said evaporator portion;
   c. a multiplicity of thermionic converters disposed on the lateral surfaces of said condenser portions for producing electricity directly from heat transferred from said evaporator to said condenser portions; and d. moderator-reflector means encircling said evaporator portions intermediate said condenser portions of said heat pipes.

5. A gaseous fueled nuclear reactor for producing electrical energy comprising:
   a. a container defining an active core region;
   b. a multiplicity of elongated heat pipes extending through said container, each of said heat pipes having an evaporator region where it extends through said container for vaporizing heat carrier fluid and at least one condenser region where it extends out of said container for condensing said heat carrier fluid;
   c. gaseous fissile fuel filling said container and the interstices of said heat pipes within said container; and
   d. a plurality of thermionic converters engaging the condenser ends of each of said heat pipes to receive heat therefrom.

6. The nuclear reactor of claim 1 wherein said gaseous fuel is plutonium and said lining is a material selected from the group consisting of carbon, niobium carbide, tantalum carbide and zirconium carbide.

7. The gaseous fueled nuclear reactor of claim 4 wherein said evaporator portion of each of said heat pipes has a rectangular cross section the major axis of which lies parallel to the axis of said container, and said condenser portion has a rectangular cross section the major axis of which lies perpendicular to the axis of said container.